United States Patent
Yang et al.

(10) Patent No.: US 11,632,774 B2
(45) Date of Patent: Apr. 18, 2023

(54) SYSTEMS AND METHODS FOR DETERMINING CANCELLATION TIMELINE FOR USER EQUIPMENT WITH MIXED PROCESSING CAPABILITIES

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/061,457

(22) Filed: Oct. 1, 2020

(65) Prior Publication Data
US 2021/0105803 A1    Apr. 8, 2021

Related U.S. Application Data

(60) Provisional application No. 62/911,061, filed on Oct. 4, 2019.

(51) Int. Cl.
*H04W 72/12*    (2009.01)
*H04W 72/1268*  (2023.01)
(Continued)

(52) U.S. Cl.
CPC ....... *H04W 72/1268* (2013.01); *H04L 5/0048* (2013.01); *H04L 27/2601* (2013.01);
(Continued)

(58) Field of Classification Search
CPC ............. H04L 5/0048; H04L 27/2601; H04W 72/0413; H04W 72/042; H04W 72/048;
(Continued)

(56) References Cited

U.S. PATENT DOCUMENTS

2020/0037245 A1*  1/2020  Lu .................. H04L 5/0078
2020/0259896 A1*  8/2020  Sachs .............. G06K 19/06037
(Continued)

OTHER PUBLICATIONS

Ericsson: "Latency Evaluation of Rel-15 URLLC", 3GPP Draft, 3GPP TSG-RAN WG1 Meeting #94b, R1-1810177, Latency Evaluation of Rel-15 URLLC, 3rd Generation Partnership Project (3GPP), Mobile Competence Centre, 650, Route Des Lucioles, F-06921 Sophia-Antipolis Cedex, France, vol. RAN WG1, No. Chengdu, P.R. China, Oct. 8, 2018-Oct. 12, 2018, Sep. 29, 2018 (Sep. 29, 2018), XP051517592, 8 Pages, Retrieved from the Internet: URL: http://www.3gpp.org/ftp/tsg%5Fran/WG1%5FRL1/TSGR1%5F94b/Docs/R1%2D1810177%2Ezip. [retrieved on Sep. 29, 2018], p. 2, paragraph 2.1 Assumptions—p. 7, paragraph table 4, 5.

(Continued)

*Primary Examiner* — Rownak Islam
(74) *Attorney, Agent, or Firm* — Haynes and Boone, LLP

(57) ABSTRACT

Wireless communications systems and methods related to an uplink transmission cancellation mechanism that determines processing time for UEs configured with mixed processing capabilities are described. Specifically, methods and systems are provided for a UE to determine which processing capability to rely on to determine the minimum processing time for cancellation. For example, when a UE is configured with a faster processing capability and a slower processing capability, the UE may be configured to always rely on the faster, or the slower processing capability. Alternatively, the UE may be configured to consider factors such as the uplink channel type, uplink channel priority, the cause of the cancellation, the priority of uplink grant, or any combination thereof, to determine whether to rely on the faster or the slower capability to obtain the minimum processing time for cancellation.

26 Claims, 9 Drawing Sheets

(51) Int. Cl.
| | |
|---|---|
| *H04W 72/04* | (2023.01) |
| *H04L 27/26* | (2006.01) |
| *H04W 72/14* | (2009.01) |
| *H04W 74/08* | (2009.01) |
| *H04W 72/10* | (2009.01) |
| *H04L 5/00* | (2006.01) |

(52) U.S. Cl.
CPC ....... *H04W 72/042* (2013.01); *H04W 72/048* (2013.01); *H04W 72/0413* (2013.01); *H04W 72/10* (2013.01); *H04W 72/14* (2013.01); *H04W 74/0833* (2013.01)

(58) Field of Classification Search
CPC . H04W 72/10; H04W 72/14; H04W 72/1268; H04W 74/0833
USPC .......................................................... 370/329
See application file for complete search history.

(56) References Cited

U.S. PATENT DOCUMENTS

| | | | | |
|---|---|---|---|---|
| 2021/0022134 | A1* | 1/2021 | Chen | ..................... H04L 5/0094 |
| 2021/0376985 | A1* | 12/2021 | Zhou | ..................... H04L 5/0053 |
| 2022/0046666 | A1* | 2/2022 | Takeda | ................. H04W 72/14 |

OTHER PUBLICATIONS

Huawei et al., "Enhancements to Scheduling / HARQ", 3GPP Draft, 3GPP TSG RAN WG1 Meeting #98, R1-1908054, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051764677, 13 Pages, Retrieved from the Internet: URL: http://www.3gpp.org/ftp/tsg_ran/WG1_RL1/TSGR1_98/Docs/R1-1908054.zip. [retrieved on Aug. 17, 2019] p. 6, paragraph 2.3.2—p. 7, paragraph 2.3.4.

International Search Report and Written Opinion—PCT/US2020/054016—ISA/EPO—dated Dec. 17, 2020.

Nokia, et al., "Discussion on Enhancements to Scheduling/HARQ for NR URLLC", 3GPP Draft, 3GPP TSG RAN WG1 Meeting #96bis, R1-1904829 NR URLLC Scheduling HARQ Enhancements, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 3, 2019 (Apr. 3, 2019), XP051707328, 6 Pages, Retrieved from the Internet: URL: http://www.3gpp.org/ftp/tsg%5Fran/WG1%5FRL1/TSGR1%5F96b/Docs/R1%2D1904829%2Ezip, [retrieved on Apr. 3, 2019] p. 5 figure 2.

Qualcomm Incorporated: "Summary for Potential Enhancements to Scheduling/HARQ/CSI Processing Timeline", 3GPP Draft, 3GPP TSG-RAN WG1 Meeting #95, R1-1814094 Summary 7.2.6.1.4 Enhancements Scheduling HARQ_CST_Processing Timeline, 3rd Generation Partnership Project (3GPP), Mobile Competence Centre, 650, Route Des Lucioles, F-06921, SO, vol. RAN WG1, No. Spokane, Washington, USA, Nov. 12, 2018-Nov. 16, 2018, Nov. 15, 2018 (Nov. 15, 2018), XP051494542, 15 Pages, Retrieved from the Internet: URL: http://www.3pgg.org/ftp/tsg%5Fran/WG1%5Frl1/TSGR1%5f95/Docs/R1%D1914094%Ezip [retrieved on Nov. 15, 2018] p. 1-p. 2.

Vivo: "Enhancement for Scheduling / HARQ / CSI Processing Timeline" 3GPP Draft, 3GPP TSG RAN WG1 Ad-Hoc Meeting 1901, R1-1900129, Enhancement for Scheduling CSI Processing Timeline, 3rd Generation Partnership Project (3GPP), Mobile Competence Centre, 650, Route Des Lucioles, F-06921 Sophia-Antipolis, vol. RAN WG1, No. Taipei, Jan. 21, 2019-Jan. 25, 2019, Jan. 12, 2019 (Jan. 12, 2019), XP051575753, 5 Pages, Retrieved from the Internet: URL: http://www.3gpp.org/ftp/tsg%5Fran/WG1%5FRL1/TSGR1%5FAH/NR%5FAH%5F1901/Docs/R1%2D1900129%2Ezip [retrieved on Jan. 12, 2019] p. 3, paragraph 3.—p. 4 figure 3, 4.

* cited by examiner

SYSTEMS AND METHODS FOR DETERMINING CANCELLATION TIMELINE FOR USER EQUIPMENT WITH MIXED PROCESSING CAPABILITIES

CROSS-REFERNECE(S)

The application is a nonprovisional of and claims priority under 35 U.S.C. 119 to co-pending and commonly-owned U.S. provisional application No. 62/911,061, filed Oct. 4, 2019.

This application is related to PCT International Application No. PCT/US2020/054016, and Taiwan Application No. 109134411, both filed on Oct. 2, 2020.

All of the above mentioned applications are hereby expressly incorporated by reference herein in their entirety.

TECHNICAL FIELD

The application technology discussed below relates to wireless communication systems, and more particularly to determining a cancellation timeline for user equipment with mixed processing capabilities, which may be utilized in $5^{th}$ Generation (5G) new radio (NR) networks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BS s), each simultaneously supporting communications for multiple communication devices, which may be otherwise known as user equipment (UE).

In the new radio (NR) Release-15 standard, a UE may be configured by the higher-layer (e.g., via radio resource control (RRC) signaling) with uplink transmissions. For example, the uplink transmission from the UE to a BS may be performed on various uplink channel types such as a physical uplink control channel (PUCCH), a physical uplink shared channel (PUSCH), the sounding reference signal (SRS), and a physical random access channel (PRACH). The UE may be scheduled to cancel these uplink transmissions via a dynamic slot-format indicator (SFI) or a dynamic grant due to contradicting uplink or downlink directions. When the cancellation of uplink transmission is scheduled, the BS leaves enough processing time for the UE to cancel the uplink transmission. For example, the UE may wait until the end of the processing time, and then cancel the transmission on symbols starting from the first symbol after the processing time since the control resource set in which the UE detects the dynamic SFI or the dynamic grant that triggers the cancellation.

Traditionally, in the NR Release-15, a UE is only allowed one processing capability on a given uplink cell, and the processing time for uplink transmission cancellation is determined by the one UE processing capability. In recent developments of the standards, such as in NR Release-16, a UE may be configured with more than one processing capability, e.g., a faster UE processing capability and a slower UE processing capability.

Therefore, there is a need for an uplink transmission cancellation mechanism that determines processing time for UEs configured with mixed processing capabilities.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication is provided. The method comprises transmitting, from a user equipment (UE) to a base station (BS), one or more symbols according to configuration parameters configured by radio resource control (RRC) signaling. The method further comprises determining, by the UE, that a cancellation of uplink transmission of the one or more symbols to the BS is scheduled, and retrieving, by the UE, a first UE capability parameter and a second UE capability parameter associated with the UE. The method further comprises determining, by the UE, a processing time for the UE before the cancellation of uplink transmission, based at least in part on a characteristic of the uplink transmission and at least one of a first processing time derived from the first UE capability or a second processing time derived from the second UE capability. The method further comprises cancelling, by the UE, the uplink transmission to the BS when the determined processing time has lapsed.

For another example, in an aspect of the disclosure, a UE of wireless communication is provided. The UE comprises a transceiver configured to transmit, to a BS, one or more symbols according to configuration parameters configured by RRC signaling. The UE further comprises a processor configured to determine that a cancellation of uplink transmission of the one or more symbols to the BS is scheduled, retrieve a first UE capability parameter and a second UE capability parameter associated with the UE, determine a processing time for the UE before the cancellation of uplink transmission, based at least in part on a characteristic of the uplink transmission and at least one of a first processing time derived from the first UE capability or a second processing time derived from the second UE capability, and cancel the uplink transmission to the BS when the determined processing time has lapsed.

For another example, in an aspect of the disclosure, a processor-readable non-transitory storage medium storing processor-executable instructions for a UE of wireless communication is provided. The instructions are executable by a processor to transmit, to a BS, one or more symbols according to configuration parameters configured by RRC signaling, determine that a cancellation of uplink transmission of the one or more symbols to the BS is scheduled, retrieve a first UE capability parameter and a second UE capability parameter associated with the UE, determine a processing time for the UE before the cancellation of uplink transmission, based at least in part on a characteristic of the uplink transmission and at least one of a first processing time derived from the first UE capability or a second processing time derived from the second UE capability, and cancel the uplink transmission to the BS when the determined processing time has lapsed.

For another example, in an aspect of the disclosure, a system of wireless communication is provided. The system comprises means for transmitting, from a UE to a BS, one or more symbols according to configuration parameters configured by RRC signaling, means for determining, by the UE, that a cancellation of uplink transmission of the one or more symbols to the BS is scheduled, means for retrieving, by the UE, a first UE capability parameter and a second UE capability parameter associated with the UE, means for determining, by the UE, a processing time for the UE before the cancellation of uplink transmission, based at least in part on a characteristic of the uplink transmission and at least one of a first processing time derived from the first UE capability or a second processing time derived from the second UE capability, and means for cancelling, by the UE, the uplink transmission to the BS when the determined processing time has lapsed.

Other aspects, features, and aspects of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
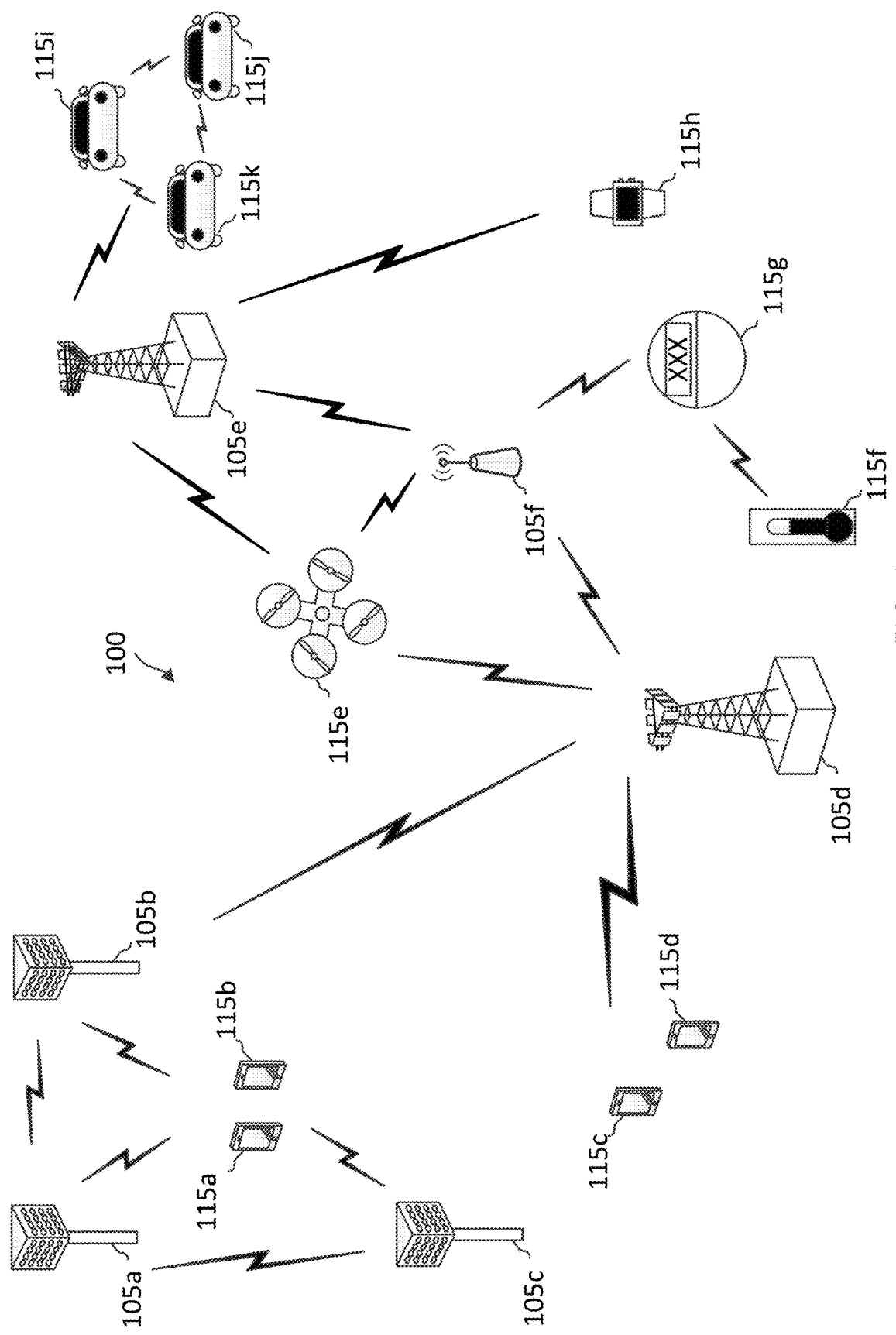
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In the new radio (NR) Release-15 standard, a UE may be configured by the higher-layer (e.g., via radio resource control (RRC) signaling) with uplink transmissions. The UE may be scheduled to cancel these uplink transmissions via a dynamic slot-format indicator (SFI) or a dynamic grant due to contradicting uplink or downlink directions. When the cancellation of uplink transmission is scheduled, the UE may wait until the end of the processing time, and then cancel the transmission on symbols starting from the first symbol after the processing time since the control resource set in which the UE detects the dynamic SFI or the dynamic grant that triggers the cancellation. The minimum processing time is usually represented by a time value in absolute time, or in the units of OFDM symbols, which are roughly equivalent. The number of OFDM symbols representing the minimum processing time can usually be determined based upon the UE processing capability, and the time value of the minimum processing time can then be computed from the number of OFDM symbols.

Traditionally, in the NR Release-15, a UE is only allowed one processing capability on a given uplink cell, and the processing time for uplink transmission cancellation is determined by the one UE processing capability. For example, the NR Release-15 provides a lookup table storing the minimum processing time in the units of OFDM symbols corresponding to different subcarrier spacing parameters. In recent developments of the standards, such as in NR Release-16, a UE may be configured with more than one processing capability, e.g., a faster UE processing capability and a slower UE processing capability. In this case, each UE processing capability is associated with a lookup table storing the minimum processing time in the units of OFDM symbols corresponding to different subcarrier spacing parameters, and the current standards do not provide a way for the UE to decide the minimum processing time in terms of various options of the processing time in the units of OFDM symbols. The processing capability parameters of the UE may be configured via RRC parameters.

In view of the need for an uplink transmission cancellation mechanism that determines processing time for UEs configured with mixed processing capabilities, embodiments described herein provide methods and systems for a UE to determine which processing capability to rely on to determine the minimum processing time for cancellation. Specifically, when a UE is configured with a faster processing capability and a slower processing capability, the UE may be configured to always rely on the faster, or the slower processing capability, e.g., depending on the type of the network, to determine the minimum processing time for cancellation. Alternatively, the UE may be configured to consider factors such as the uplink channel type, uplink channel priority, the cause of the cancellation, the priority of uplink grant, or any combination thereof, to determine whether to rely on the faster or the slower capability to obtain the minimum processing time for cancellation.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BS s 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure UEs 115 with narrowband operation capabilities (e.g., with transmission and/or reception limited to a BW of 20 MHz or less) to perform BWP hopping for channel monitoring and communications. Mechanisms for performing BWP hopping are described in greater detail herein.

Figure 2:
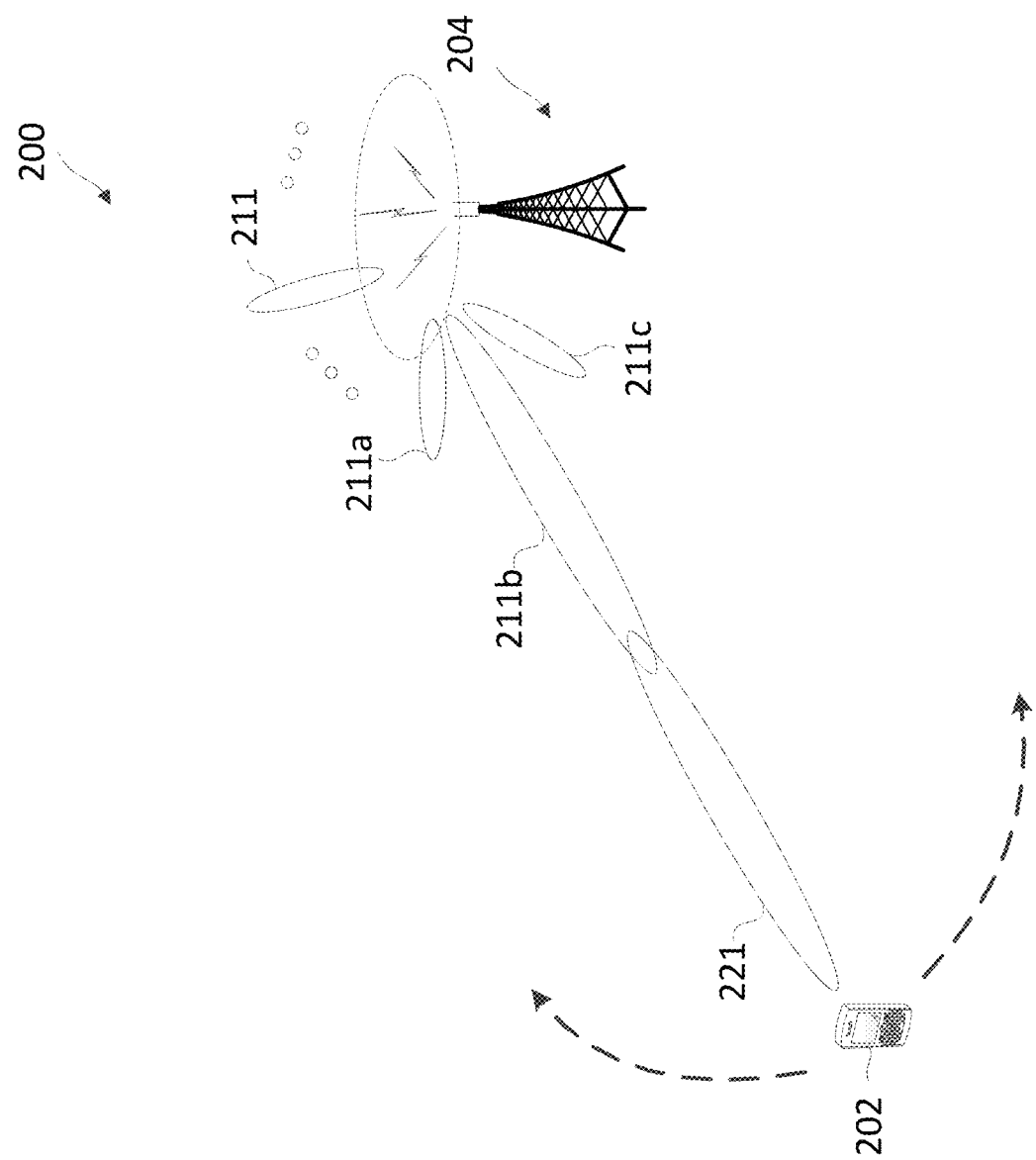
FIG. 2 illustrates a transmission scheme in the wireless communication network shown in FIG. 1, according to aspects of the present disclosure.

FIG. 2 illustrates a transmission scheme in a wireless communication network 200 according to aspects of the present disclosure. The network 200 corresponds to a portion of the network 100. FIG. 2 illustrates one BS 204 and one UE 202 for purposes of simplicity of discussion, though it will be recognized that aspects of the present disclosure may scale to many more UEs 202 and/or BSs 204. The BS 204 corresponds to one of the BSs 104. The UE 202 corresponds to one of the UEs 102. The UE 202 and BS 204 may communicate with each other at any suitable frequencies.

In FIG. 2, BS 204 sends synchronization signals, BRSs, and system information over a plurality of directional beams 211 in a plurality of directions as shown by the dashed oval 220. To access the network 200, UE 202 listens to the synchronization signals and/or the BRSs and selects a beam for performing a random access procedure. For example, UE 202 can receive the beams 211a, 211b, and 211c and selects the beam 211b for the random access. The UE 202 sends a random access preamble over a beam 221 in the beam direction of the beam 211b and monitors for a RAR from BS 204. Upon detecting the random access preamble, BS 204 sends a RAR over the beam 211b in the same beam direction at which the random access preamble is received. The BS 204 sends the RAR over the beam 211b using an entire subframe. This can be resource inefficient when a large bandwidth is available. In addition, by the time BS 204 sends the RAR, UE 202 may have moved to a different location away from the beam 211b as shown by the dashed arrows. Thus, UE 202 may fail to receive the RAR from the beam 211b. An additional cause of RAR failure may be due to beam correspondence. Although UE 202 may retry for another random access attempt after waiting for a period of time (e.g., a backoff period), the retry adds additional latency. Thus, sending a single random access preamble over a single beam direction per random access attempt may not be robust enough to successfully complete the RACH procedure.

Figure 3:
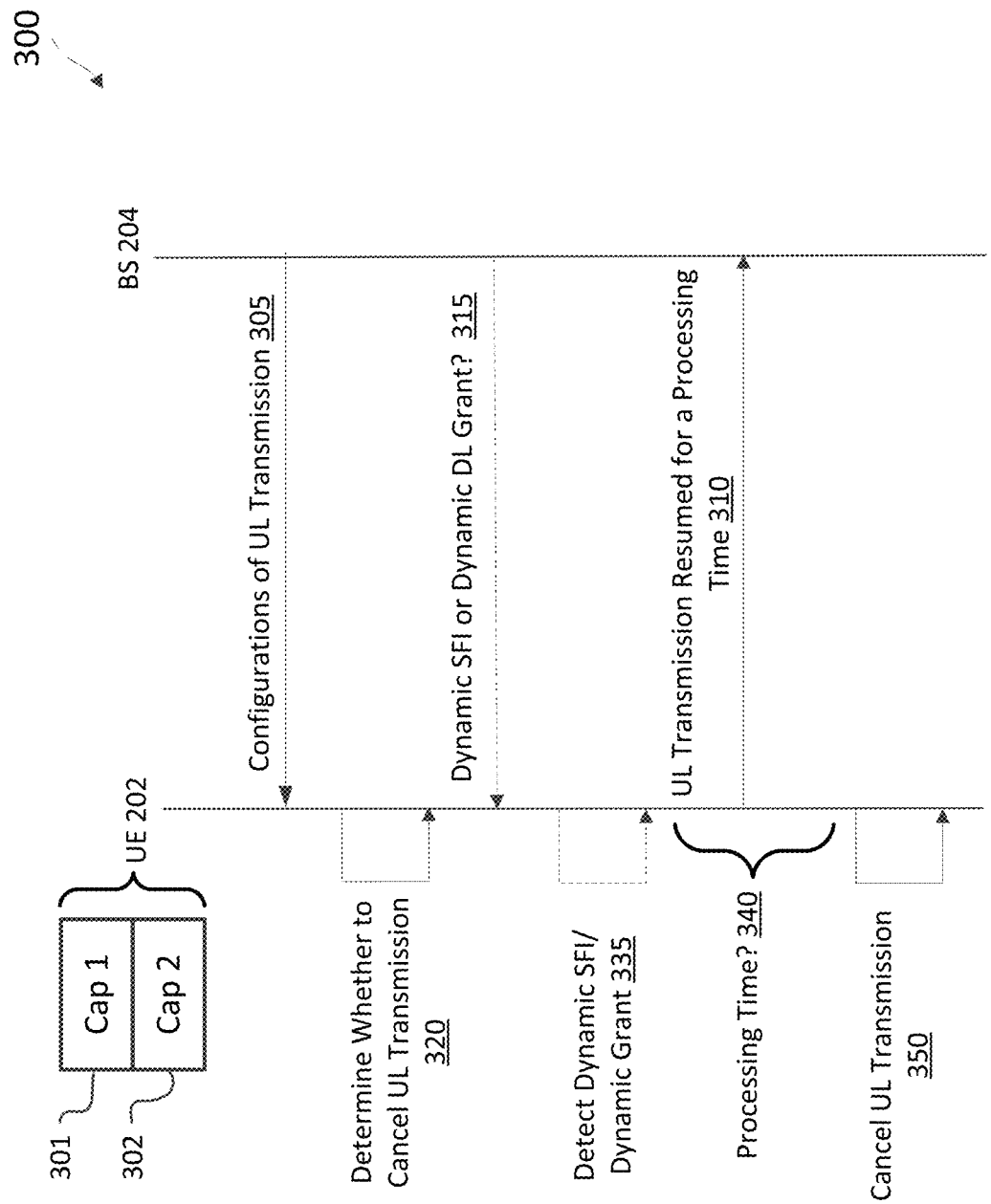
FIG. 3 illustrates a scenario of uplink transmission scenario between a UE and a BS that may be implemented in the wireless communication network shown in FIGS. 1-2, according to some aspects of the present disclosure.

FIG. 3 illustrates a scenario of uplink transmission scenario between a UE 202 and a BS 204 that may be implemented in the wireless communication network shown in FIGS. 1-2, according to some aspects of the present disclosure. The UE 202 and BS 204 shown in FIG. 3 may be similar to the UE 202 and BS 204 described in relation to FIG. 2, or the UE 115 and BS 105 described in relation to FIG. 1, respectively.

In an uplink cell comprising the UE 202 and BS 204, UE 202 may receive configuration parameters of uplink transmission at 305. The NR Release-15 allows such higher-layer configured uplink transmissions to be cancelled by a dynamic (slot-format indicator) SFI or a dynamic downlink grant that indicates contradicting uplink or downlink directions. For example, UE 202 may receive a dynamic SFI (e.g., at 315) indicating a subset of symbols of the uplink transmission as "flexible" (either downlink or uplink) or "downlink", e.g., in the time division duplexing (TDD) mode, a symbol can be configured as either uplink, downlink or flexible. While UE 202 may determine whether to cancel the uplink transmission 305 at 320, UE 202 may detect the dynamic SFI that triggers the cancellation decision at 335. In this case, UE 202 may wait for a minimum cancellation time of $T_{proc,2}$ during which UE 202 may continue transmitting uplink symbols to BS 204 at 310.

For another example, UE 202 may not receive any dynamic SFI as confirmation signaling to cancel (illustrated by the dashed lines of 315 and 335 indicating the received dynamic SFI is optional). Instead, UE 202 may receive information that a subset of the symbols of uplink transmission are indicated as "flexible" by semi-static TDD uplink or downlink configuration, or an indication that UE 202 is not configured with semi-static TDD uplink or downlink configuration. In this case, UE 202 determines that the uplink transmission is to be canceled without receiving any dynamic SFI at 320, and then wait for a minimum cancellation time in the units of $N_2$ symbols before cancellation.

For another example, UE 202 may receive a dynamic grant at 315 and detect the dynamic grant at 335 which triggers the cancellation. For instance, the dynamic grant includes a downlink control information (DCI) format of 1_0, 1_1 or 0_1, indicating that UE 202 may receive some downlink signals CSI-RS or PDSCH in a subset of symbols. In this case, UE 202 determines that the uplink transmission is to be canceled at 320, and then wait for a minimum cancellation time of $T_{proc,2}$ before cancellation.

In another embodiment, UE 202 may determine that the uplink transmission is to be canceled at 320, due to receiving a dynamic uplink grant. For instance, the uplink transmission may be a PUSCH transmission with a configured grant. In this case, UE 202 may determine that the uplink transmission is to be cancelled if UE 202 receives a dynamic uplink grant that triggers the cancellation, e.g., not due to the conflict of uplink/downlink direction, but due to a conflict of grant.

For example, the dynamic uplink grant may have a same HARQ process ID as the configured grant PUSCH transmission. In this case, UE 202 may cancel the configured grant PUSCH transmission and transmit a PUSCH according to the dynamic grant.

In another example, the dynamic uplink grant may have a different HARQ process ID as the configured grant PUSCH, but the resource for the dynamic grant PUSCH overlaps in time with the configured grant PUSCH. In this case, the UE may also cancel the configured grant PUSCH transmission and transmit a PUSCH according to the dynamic grant.

After the minimum processing time at 340, UE 202 may cancel the uplink transmission 350. For example, UE 202 may cancel all the PUCCH/PUSCH/PRACH symbols after the processing time 340. For another example, UE 202 may only cancel SRS on symbols that have contradicting uplink or downlink directions after the processing time 340.

In some embodiments, the UE processing time 340 is determined such that BS 204 leaves enough time for UE 202 to process a transmission or a reception. For example, the processing time may be measured in units of the number of symbols $N_1$ or $N_2$, or a time value $T_{proc,2}$. Specifically, the number $N_1$ denotes the number of OFDM symbols required for UE processing from the end of PDSCH reception to the earliest possible start of the corresponding ACK/NACK message sent from UE 202 to BS 204. The number $N_2$ denotes the number of OFDM symbols required for UE processing from the end of PDCCH containing the uplink grant to the earliest possible start of the corresponding PUSCH transmission from the perspective of UE 202. In general, UE 202 is not expected to transmit anything in the uplink if the network set the values of actual processing time $K_1$ or $K_2$ without leaving sufficient time for UE processing. Thus, the actual UE processing time $K_1$ or $K_2$ must be greater than the minimum processing time $N_1$ or $N_2$, respectively.

Here, the number $N_2$ is relevant to the processing time 340 that UE 202 needs to process the cancellation as $N_2$ pertains to the UE processing time from the end of PDCCH containing the uplink grant to the earliest possible start of the corresponding PUSCH transmission, e.g., the earliest symbol to be cancelled. Traditionally, in NR Release-15, where a UE is configured with only one processing capability, the number $N_2$ can be retrieved from a lookup table associated with the one processing capability. When UE 202 is configured with mixed processing capabilities, e.g., in NR Release-16, UE 202 may be associated with a slower processing capability, denoted by "Cap 1" 301, which is usually used in enhanced mobile broadband (eMBB) networks, and a higher processing capability, denoted by "Cap 2" 302, which is usually used in ultra-reliable low-latency communication (URLLC). Each processing capability 301 or 302 may be associated with a lookup table for the minimum PUSCH preparation time, in the units of OFDM symbols. For example, Tables 1-2 illustrate examples PUSCH preparation time (in the units of $N_2$ symbols) for Cap 1 (301) and Cap 2 (302), respectively:

TABLE 1

N2 for Cap 1

| μ | PUSCH Preparation Time $N_2$ (Number of Symbols) |
|---|---|
| 0 | 10 |
| 1 | 12 |
| 2 | 23 |
| 3 | 36 |

TABLE 2

N2 for Cap 2

| μ | PUSCH Preparation Time $N_2$ (Number of Symbols) |
|---|---|
| 0 | 5 |
| 1 | 5.5 |
| 2 | 11 for frequency range 1 | where μ denotes the subcarrier spacing in OFDM (e.g., "0" denotes 15 MHz, "1" denotes 30 MHz, etc.). As shown in Tables 1-2, with the faster processing capability Cap 2, the minimum preparation time $N_2$ may be smaller compared to those associated with the slower processing capability Cap 1.

Figure 6:
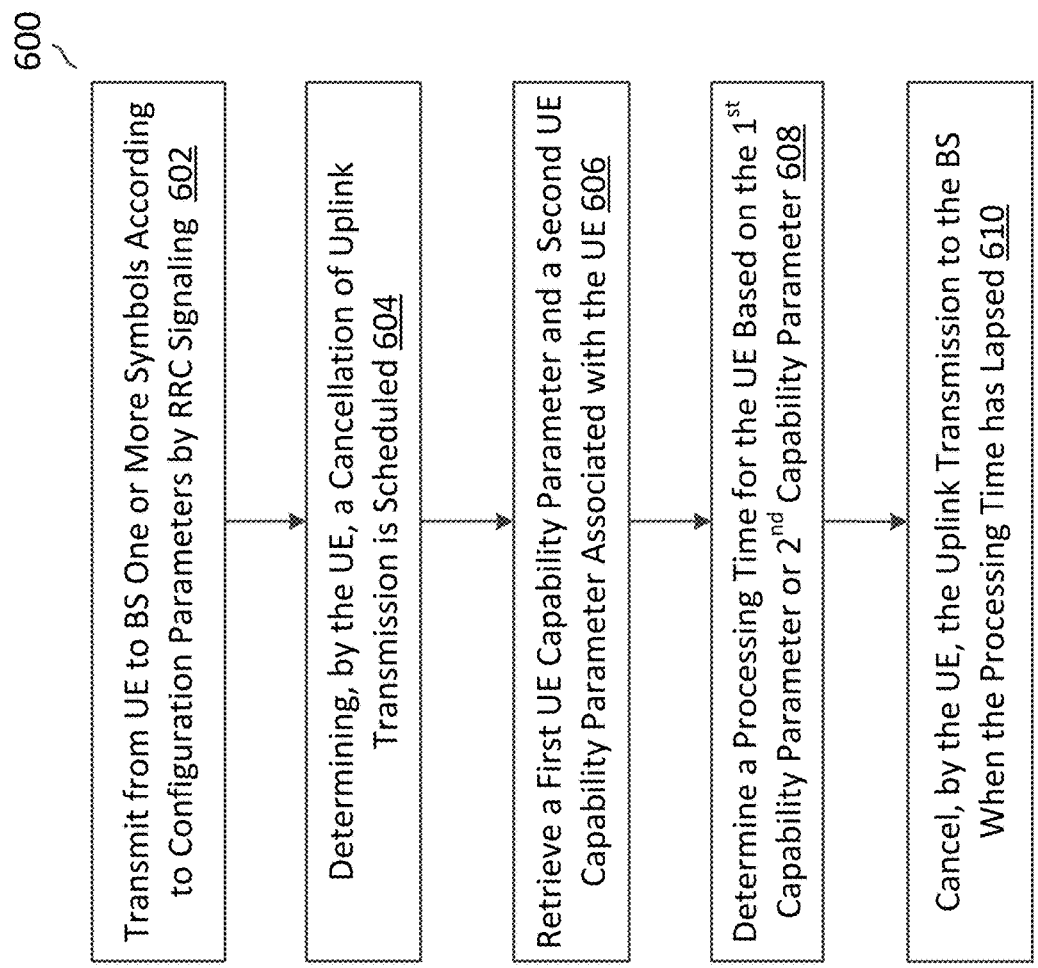
FIG. 6 illustrates a logic flow performed by the UE corresponding to the uplink transmission cancellation shown in FIG. 3 according to some aspects of the present disclosure.
Figure 7B:
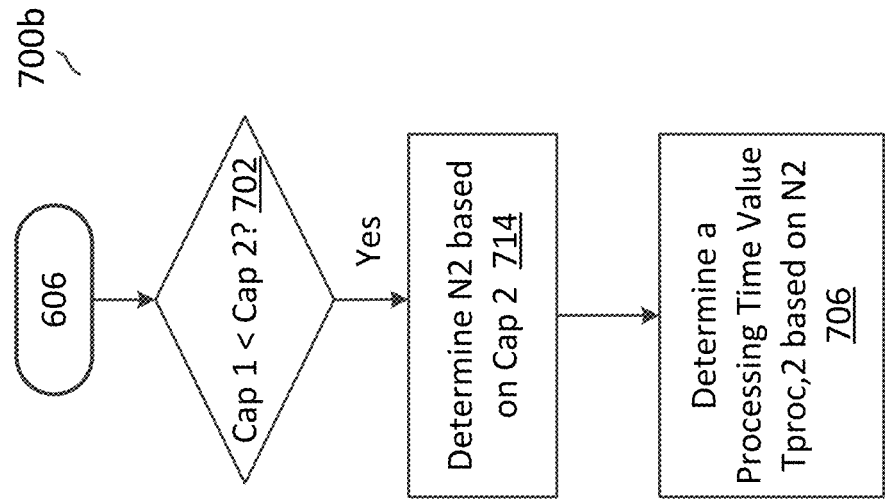
FIGS. 7A-7D illustrate logic flows performed by the UE to determine a processing time for uplink transmission when the UE is configured with two processing capabilities according to some aspects of the present disclosure.
Figure 7A:
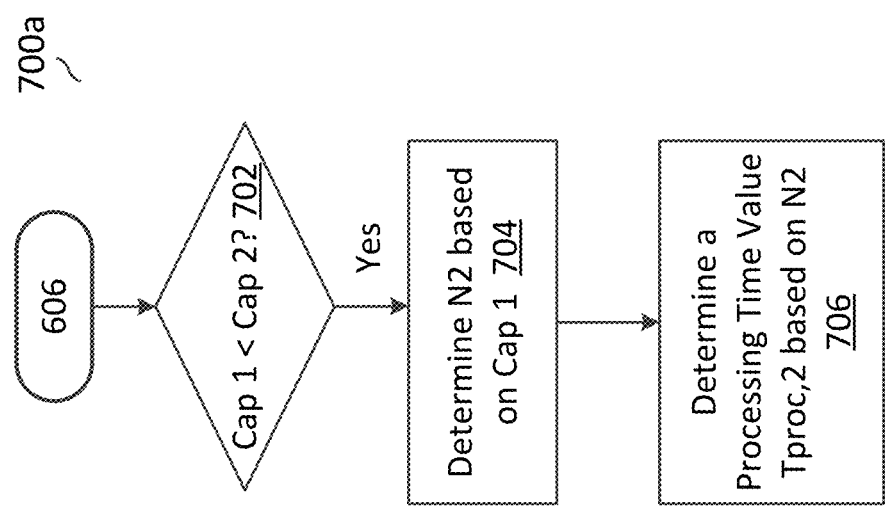
Figure 7C:
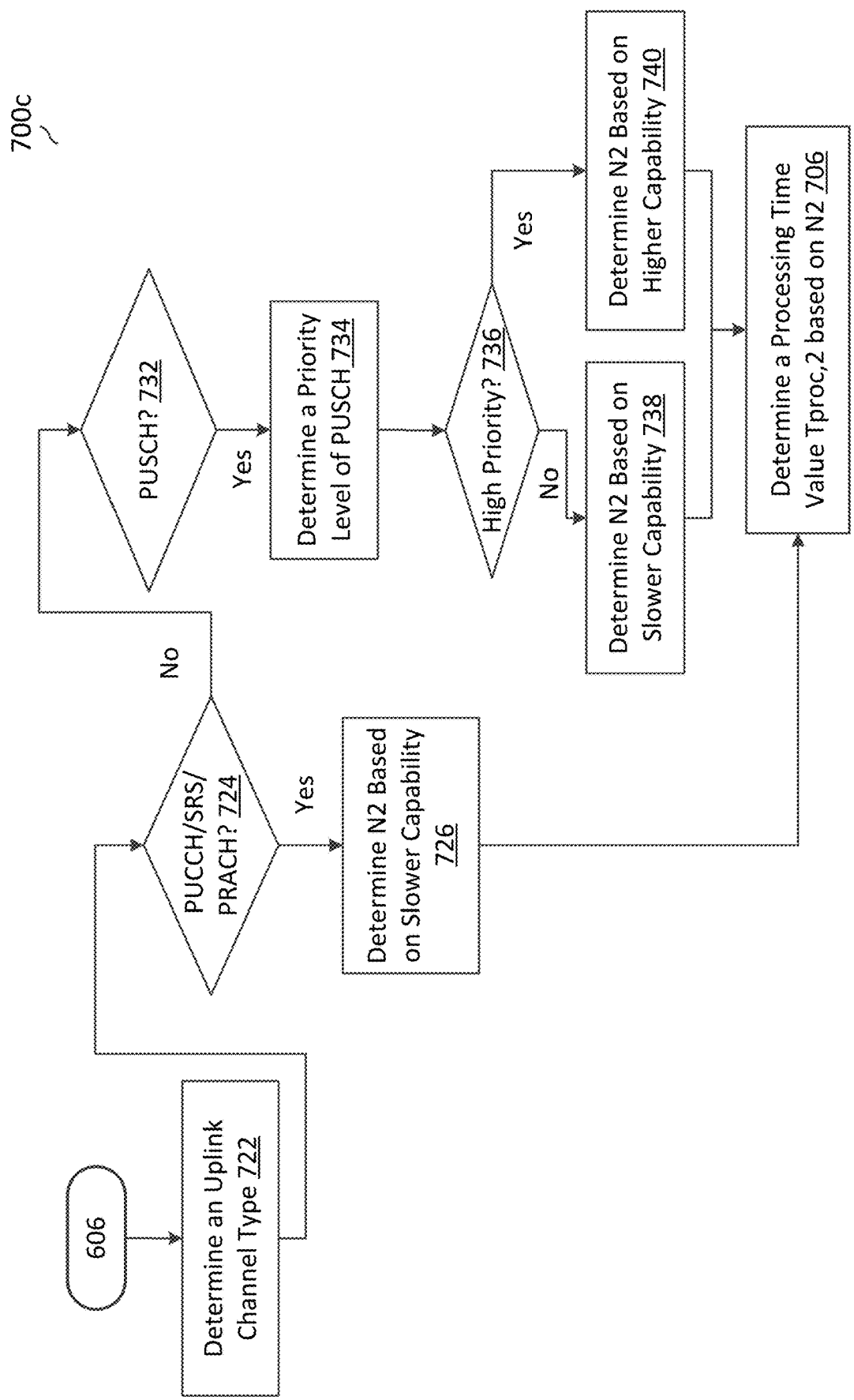
Figure 7D:
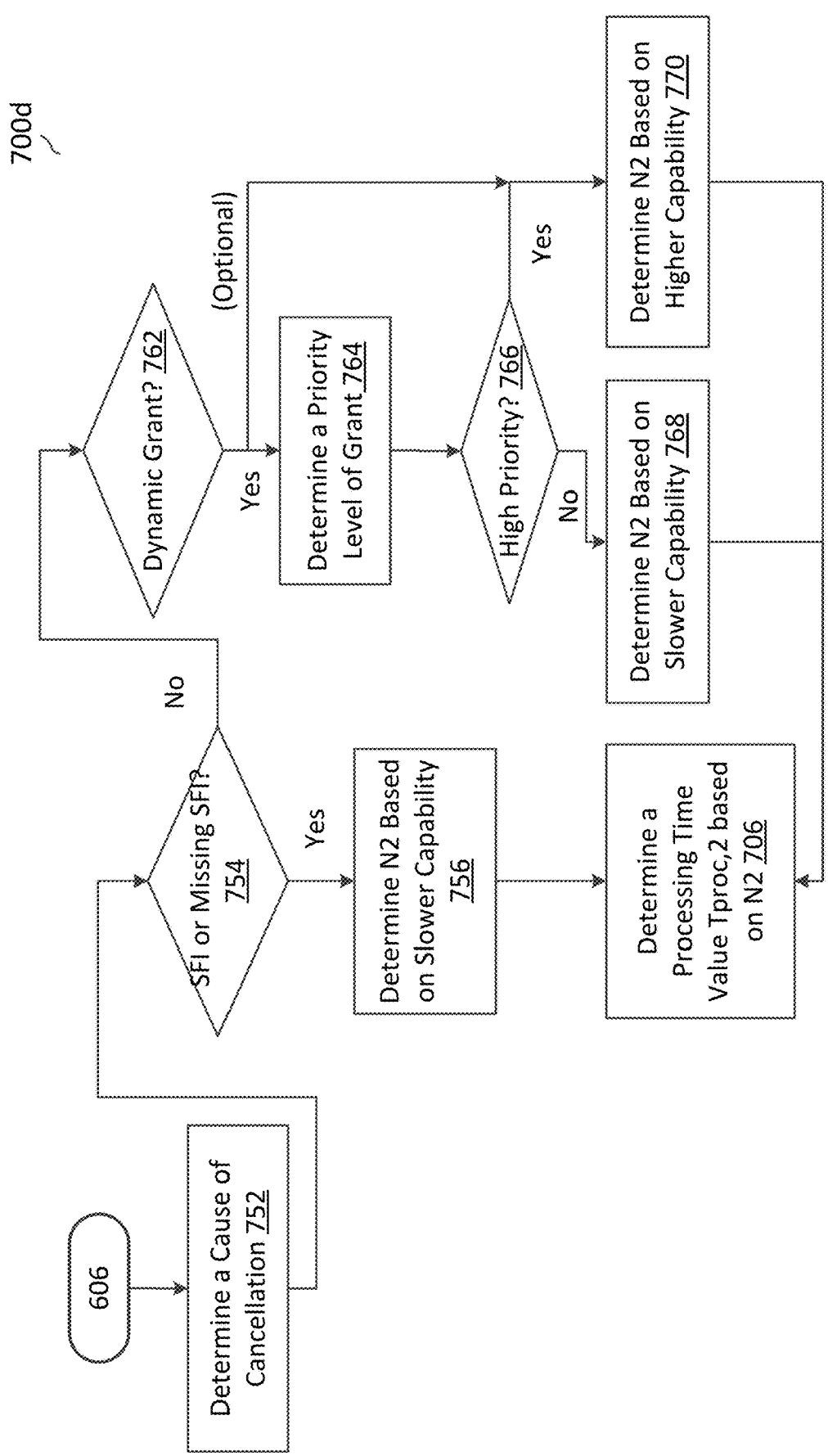

Thus, UE 202 may determine the number of $N_2$ based on at least one of Tables 1-2, e.g., by relying on Cap 1 or Cap 2, which is further discussed in relation to FIGS. 6-7D. Once UE 202 determines $N_2$, the corresponding time value $T_{proc,2}$ for the processing time 340 can be computed. For example, $T_{proc,2}$ can be equivalent to the time value of the $N_2$ symbols if the first symbol of PUSCH consists of demodulation reference signals (DMRS) only, or the time value of ($N_2$+1) symbols if the symbol of PUSCH contains both DMRS and data, or the time value of the BWP switching time when the uplink grant indicates a BWP switch.

Figure 4:
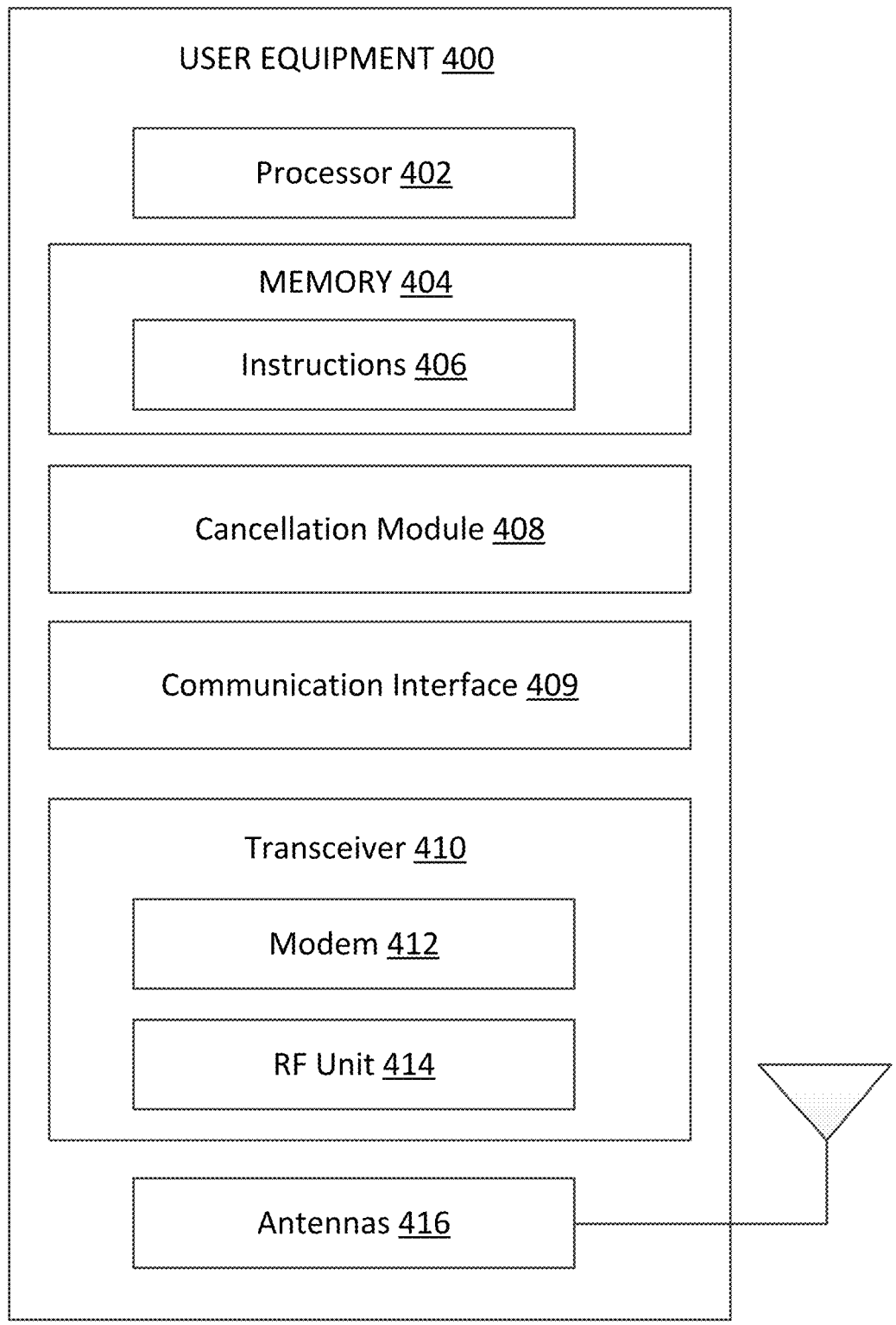
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or UE 202 shown in other figures, for example. As shown, the UE 400 may include a processor 402, a memory 404, a cancellation module 408, a communication interface 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3 and 6-7D. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The cancellation module 408 may communicate with the communication interface 409 to receive from or transmit messages to another device. Each of the cancellation module 408 and the communication interface 409 may be implemented via hardware, software, or combinations thereof. For example, each of the cancellation module 408 and the communication interface 409 may be implemented as a processor, circuit, and/or instructions 406 stored in the memory 404 and executed by the processor 402. In some examples, the cancellation module 408 and the communication interface 409 can be integrated within the modem subsystem 412. For example, the cancellation module 408 and the communication interface 409 can be implemented by a combination of software components (e.g., executed by a DSP or a general processor) and hardware components (e.g., logic gates and circuitry) within the modem subsystem 412. In some examples, a UE may include one of the cancellation module 408 and the communication interface 409. In other examples, a UE may include both the cancellation module 408 and the communication interface 409.

The cancellation module 408 and the communication interface 409 may be used for various aspects of the present disclosure, for example, aspects of FIGS. 3 and 6-7D. The cancellation module 408 is configured to transmit, from a user equipment (UE) to a base station (BS), one or more symbols according to configuration parameters configured by radio resource control (RRC) signaling. The cancellation module 408 is further configured to determine that a cancellation of uplink transmission of the one or more symbols to the BS is scheduled and retrieve a first UE capability parameter and a second UE capability parameter associated with the UE. The cancellation module 408 is then configured to determine a processing time for the UE before the cancellation of uplink transmission, based at least in part on a characteristic of the uplink transmission and at least one of a first processing time derived from the first UE capability or a second processing time derived from the second UE capability, and then cancel the uplink transmission to the BS when the determined processing time has lapsed.

The communication interface 409 is configured to coordinate with the cancellation module 408 to receive downlink scheduling grants from the BS, and/or communicate with the BS according to the uplink and/or downlink scheduling grants.

As shown, the transceiver 410 may include the modem subsystem 412 and the RF unit 414. The transceiver 410 can be configured to communicate bi-directionally with other devices, such as the BS s 105. The modem subsystem 412 may be configured to modulate and/or encode the data from the memory 404, the cancellation module 408, and/or the communication interface 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL data blocks, PDSCH, PUSCH, BWP hopping configurations and/or instructions) to the cancellation module 408 and/or communication interface 409 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
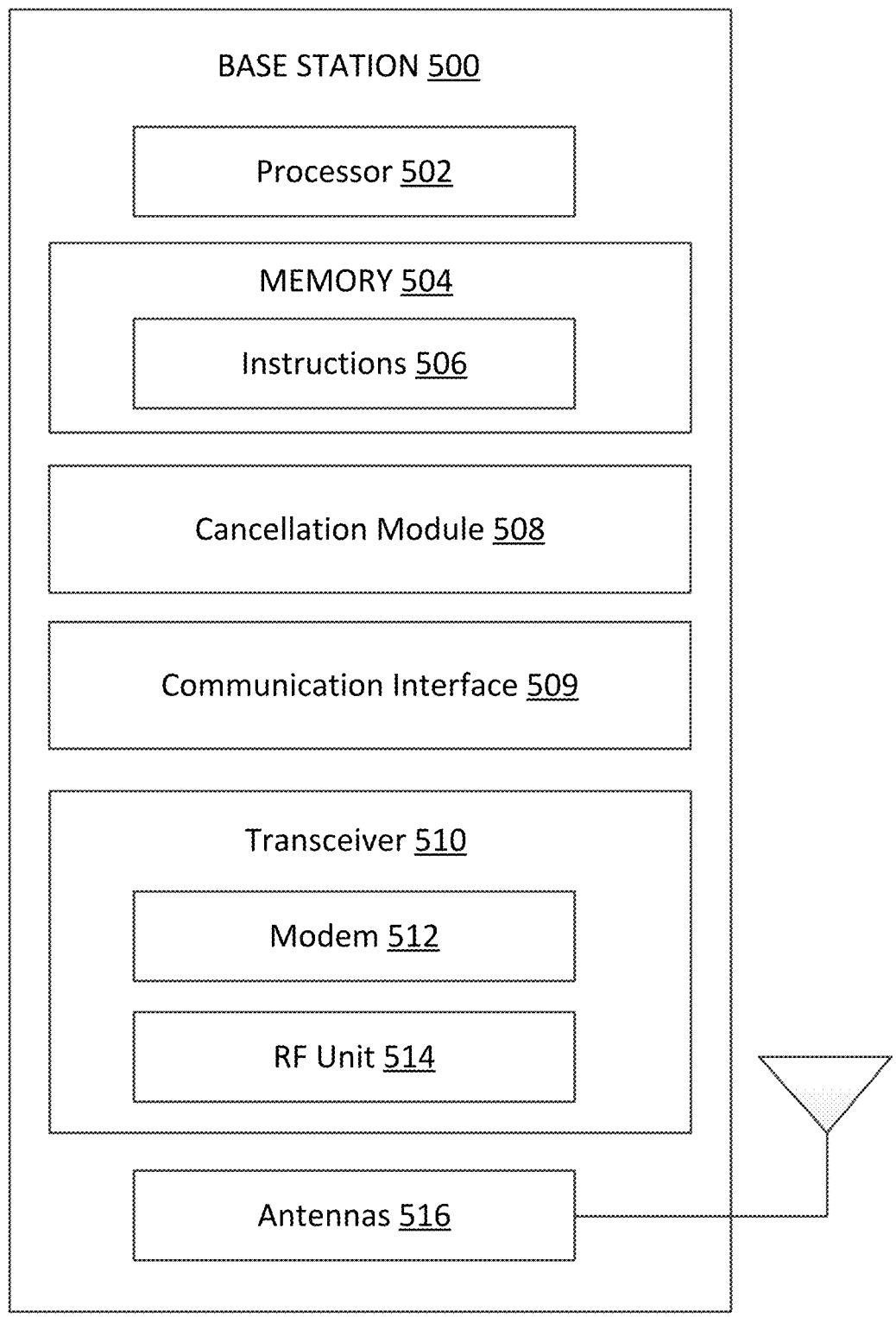
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1 and BS 204 described in other figures, for example. As shown, the BS 500 may include a processor 502, a memory 504, a cancellation module 508, a communication interface 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

The cancellation module 408 may communicate with the communication interface 409 to receive from or transmit messages to another device. Each of the cancellation module 508 and the communication interface 509 may be implemented via hardware, software, or combinations thereof. For example, each of the cancellation module 508 and the communication interface 509 may be implemented as a processor, circuit, and/or instructions 506 stored in the memory 504 and executed by the processor 502. In some examples, the cancellation module 508 and the communication interface 509 can be integrated within the modem subsystem 512. For example, the cancellation module 508 and the communication interface 509 can be implemented by a combination of software components (e.g., executed by a DSP or a general processor) and hardware components (e.g., logic gates and circuitry) within the modem subsystem 512. In some examples, a UE may include one of the cancellation module 508 and the communication interface 509. In other examples, a UE may include both the cancellation module 508 and the communication interface 509.

The cancellation module 508 and the communication interface 509 may be used for various aspects of the present disclosure, for example, aspects of FIGS. 3 and 6-7D. The cancellation module 508 is configured to send, through the communication interface 509 dynamic SFI or dynamic grants to the UE, which may cause the cancellation of uplink transmission at the UE.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the cancellation module 508 and/or communication interface 509 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

FIG. 6 illustrates a logic flow performed by the UE corresponding to the uplink transmission cancellation shown in FIG. 3 according to some aspects of the present disclosure. Steps of the methods 600 can be executed by a computing device (e.g., a processor, processing circuit, and/or other suitable component) of a wireless communication device or other suitable means for performing the steps. For example, a wireless communication device, such as the UE 115, UE 202 or UE 400, may utilize one or more components, such as the processor 402, the memory 404, the cancellation module 408, the communication interface 409, the transceiver 410, the modem 412, and the one or more antennas 416, to execute the steps of method 600. The method 600 may employ in conjunction with diagrams 300 described above with respect to FIG. 3. As illustrated, the method 600 include a number of enumerated steps, but aspects of the method 600 includes additional steps before, after, and in between the enumerated steps. In some aspects, one or more of the enumerated steps may be omitted or performed in a different order.

At step 602, one or more symbols may be transmitted from a UE to a BS according to configuration parameters by RRC signaling. For example, as shown in FIG. 3, the UE 202 may be configured by the higher-layer with uplink transmissions, e.g., PUCCH, PUSCH, SRS and PRACH.

At step 604, a cancellation of uplink transmission is scheduled. For example, as discussed in relation to FIG. 3, UE 202 may receive a dynamic SFI or dynamic grant indicating contradicting uplink or downlink directions for a subset of symbols that may cause the cancellation of uplink transmission. Or UE 202 may detect conflicts of grant in configured PUSCH.

At step 606, a first UE capability and a second UE capability parameter associated with the UE can be retrieved. For example, as discussed in relation to FIG. 3, UE 202 may be configured with two processing capabilities Cap 1 and Cap 2 on an uplink carrier over which the uplink transmission is configured, each of which is associated with the minimum required PUSCH processing time (in the units of $N_2$ symbols) as shown in Tables 1-2, respectively.

At step 608, a processing time may be determined for the UE based on the first capability parameter or the second capability parameter. For example, as further described in relation to FIGS. 7A-7D, a UE may determine whether to rely on Cap 1 or Cap 2 to determine the minimum PUSCH processing time, $N_2$ symbols, based on uplink channel type, uplink priority type, the cause of cancellation, and/or the like.

At step 610, the uplink transmission to the BS may be cancelled when the processing time has lapsed. For example, as discussed in relation to FIG. 3, UE 202 may cancel all the PUCCH/PUSCH/PRACH symbols after the processing time. For another example, UE 202 may only cancel SRS on symbols that have contradicting uplink or downlink directions after the processing time.

FIGS. 7A-7D illustrate logic flows performed by the UE to determine a processing time for uplink transmission when the UE is configured with two processing capabilities according to some aspects of the present disclosure. Steps of the methods 700a-d can be executed by a computing device (e.g., a processor, processing circuit, and/or other suitable component) of a wireless communication device or other suitable means for performing the steps. For example, a wireless communication device, such as the UE 115, UE 202 or UE 400, may utilize one or more components, such as the processor 402, the memory 404, the cancellation module 408, the communication interface 409, the transceiver 410, the modem 412, and the one or more antennas 416, to execute the steps of methods 700a-d. The methods 700a-d may employ in conjunction with diagrams 300 described above with respect to FIG. 3. As illustrated, the methods 700a-d include a number of enumerated steps, but aspects of the methods 700a-d include additional steps before, after, and in between the enumerated steps. In some aspects, one or more of the enumerated steps may be omitted or performed in a different order.

Methods 700a-b show that the UE may be configured to always rely on Cap 1 or Cap 2 to determine the minimum processing time of $N_2$ symbols. At step 702, UE may determine that Cap 1 (the slower capability) is less than Cap 2 (the higher capability). In diagram 700a, when the UE is configured to always rely on Cap 1, at step 704, the UE determines the minimum processing time of $N_2$ symbols based on Cap 1. For example, the UE may retrieve the PUSCH preparation time from Table 1 corresponding to Cap 1 based on the subcarrier spacing parameter. In this way, by always relying on the slower Cap 1, the UE processing burden may be relaxed.

Alternatively, at diagram 700b, when the UE is configured to always rely on Cap 2, at step 714, the UE determines the minimum processing time of $N_2$ symbols based on Cap 2. For example, the UE may retrieve the PUSCH preparation time from Table 2 corresponding to Cap 2 based on the subcarrier spacing parameter. For instance, it usually takes less time for the UE to cancel an uplink transmission than to prepare an uplink transmission. Here, as $N_2$ is defined as the PUSCH preparation time, the UE may be able to cancel the uplink transmission using a shorter processing time, e.g., by relying on the higher Cap 2 that yields a shorted processing time.

At step 706, the processing time value $T_{proc,2}$ can be computed based on the minimum processing time of $N_2$ symbols. For example, $T_{proc,2}$ can be equivalent to the time value of the $N_2$ symbols if the first symbol of PUSCH consists of demodulation reference signals (DMRS) only, or the time value of $(N_2+1)$ symbols if the symbol of PUSCH contains both DMRS and data, or the time value of the BWP switching time when the uplink grant indicates a BWP switch.

Method 700c in FIG. 7C provides another alternative embodiment of determining the processing time based on uplink channel type or uplink channel priority type. At step 722, an uplink channel type may be determined. For example, the UE may determine whether the uplink channel type is PUCCH, SRS, PRACH or PUSCH. At step 724, if the UE determines that the uplink channel is one of PUCCH, SRS or PRACH, method 700c proceeds to step 726. At step 726, the minimum processing time of $N_2$ symbols is determined based on the slower capability. For example, the UE may retrieve the preparation time from Table 1 corresponding to Cap 1 based on the subcarrier spacing parameter.

If at step 732, the UE determines that the uplink channel is PUSCH, method 700c proceeds to step 734. At step 734, the priority level of PUSCH is determined. If the PUSCH is determined to have a high priority at step 736, the minimum processing time of $N_2$ symbols is determined based on the higher capability at step 740. For example, the UE may retrieve the preparation time from Table 2 corresponding to Cap 2 based on the subcarrier spacing parameter. Otherwise, if the PUSCH is determined to have a low priority at step 736, the minimum processing time of $N_2$ symbols is determined based on the slower capability at step 738. For example, the UE may retrieve the preparation time from Table 1 corresponding to Cap 1 based on the subcarrier spacing parameter.

Method 700c may proceed from steps 726, 738 and 740 to step 706, at which the processing time value $T_{proc,2}$ can be computed based on the minimum processing time of $N_2$ symbols.

Method 700d in FIG. 7D provides another alternative embodiment of determining the processing time based on the cause of cancellation. At step 752, the UE may determine a cause of the cancellation, e.g., whether the cancellation is caused by a received dynamic SFI, a dynamic grant, or the like. At step 754, when the cancellation is caused by a received dynamic SFI or a missing SFI (e.g., when the UE fails to detect an SFI that is supposed to confirm the uplink transmission), method 700d proceeds to step 756, at which the minimum processing time of $N_2$ symbols is determined based on the slower capability.

Otherwise, if the cancellation is caused by a dynamic grant at step 762, the UE may proceed to determine a priority level of the grant at step 764. For example, at least a portion of the minimum processing time of $N_2$ symbols is allocated for PDCCH decoding, which depends on the priority of the grant. UE may decode grants with higher priority first, yielding a shorted PDCCH decoding time, and decode grants with lower priority later, yielding a longer PDCCH decoding time. The difference in PDCCH decoding time may reflect upon the different minimum processing time of $N_2$ symbols.

At step 766, if the grant has a high priority, method 700d proceeds to step 770, at which the minimum processing time of $N_2$ symbols is determined based on the higher capability. Or at step 766, if the grant has a low priority, method 700d proceeds to step 768, at which the minimum processing time of $N_2$ symbols is determined based on the slower capability.

In some embodiments, at step 762, method 700d may optionally proceed to step 770, at which the UE is always configured to determine the minimum processing time of $N_2$ symbols based on the higher capability.

Method 700d may proceed from steps 756, 768 and 770 to step 706, at which the processing time value $T_{proc,2}$ can be computed based on the minimum processing time of $N_2$ symbols.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In some embodiments, methods 700a-d illustrate determining which UE processing capability to rely on in order to compute the processing time for uplink transmission cancellation. In a similar embodiment, the UE may pre-compute a first processing time based on Cap 1 and a second processing time on Cap 2, and then determine whether to adopt the first processing time or the second processing time. When Cap 1 is less than Cap 2, the first processing time is usually longer than the second processing time.

For example, the UE may always adopt the longer first processing time in accordance with method 700a, or always adopt the shorter second processing time in accordance with method 700b.

For another example, in accordance with method 700c, the UE may adopt the longer first processing time when the uplink channel is one of PUCCH, SRS or PRACH at step 724. Or if the uplink channel is PUSCH at step 732, the UE may adopt the longer first processing time when the PUSCH is assigned a low priority (similar to step 738), or adopt the shorted second processing time when the PUSCH is assigned a high priority (similar to step 740).

For another example, in accordance with method 700d, when a SFI is received or missing at step 754, the UE adopts the longer first processing time (similar to step 756). When a dynamic grant is determined at step 762, the UE adopts the longer first processing time if the grant is of low priority (similar to step 768), or adopts the shorted second processing time if the grant is of high priority (similar to step 770).

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
    transmitting, from a user equipment (UE) configured with a first UE processing capability parameter and a second UE processing capability parameter on an uplink carrier, to a base station (BS), an uplink transmission on one or more symbols;
    determining, by the UE, that a cancellation of the uplink transmission on the one or more symbols to the BS is scheduled;
    determining, by the UE, a processing time for the UE before the cancellation of the uplink transmission to be a first processing time derived from the first UE processing capability parameter in response to a low priority grant indicating a request to cancel the uplink transmission or to be a second processing time derived from the second UE processing capability parameter in response to a high priority grant indicating the request to cancel the uplink transmission, wherein the first processing time is greater than the second processing time; and
    cancelling, by the UE, the uplink transmission to the BS when the determined processing time has lapsed.

2. The method of claim 1, wherein the first UE processing capability, parameter and the second UE processing capability parameter are configured according to one or more radio resource control (RRC) configuration parameters received from the BS.

3. The method of claim 1, wherein the determining the processing time for the UE further comprises:
    determining the first processing time by:
        retrieving a first pre-stored preparation time in a format of a first number of symbols according to a subcarrier spacing parameter used in an orthogonal frequency division multiplexing (OFDM) scheme and the first UE processing capability parameter, and,
        computing a first processing time value based on the first number of symbols; and
    determining the second processing time by:
        retrieving a second pre-stored preparation time in a format of a second number of symbols according to the subcarrier spacing parameter used in the OFDM scheme and the second UE processing capability parameter, and,
        computing a second processing time value based on the second number of symbols.

4. The method of claim 3, wherein the determining the processing time for the UE further comprises:
    adopting the first processing time as the processing time for the UE before the cancellation of uplink transmission.

5. The method of claim 3, wherein the determining the processing time for the UE further comprises:
    adopting the second processing time as the processing time for the UE before the cancellation of uplink transmission.

6. The method of claim 1, wherein the determining the processing time for the UE further comprises:
    determining that the uplink transmission between the UE and the BS is of a first type, and adopting the first processing time as the processing time for the UE based on the first type; or
    determining that the uplink transmission between the UE and the BS is of a second type that is different from the first type, and adopting the second processing time as the processing time based on the second type.

7. The method of claim 6, wherein the first type includes at least one of:
    a physical uplink control channel (PUCCH) transmission,
    a sounding reference signal (SRS) transmission, or
    a physical random-access channel (PRACH) transmission.

8. The method of claim 1, wherein the determining the processing time for the UE further comprises:

determining that the uplink transmission between the UE and the BS is a PUSCH with configured grant;
determining a priority level of PUSCH with configured grant between the UE and the BS;
adopting the first processing time as the processing time for the UE before the cancellation of uplink transmission when the PUSCH is assigned a low priority level; and
adopting the second processing time as the processing time for the UE before the cancellation of uplink transmission when the PUSCH is assigned a high priority level.

9. The method of claim 1, wherein the cancellation of the uplink transmission on the one or more symbols is due to at least one of following conditions:
a dynamic slot-format indicator (SFI) indicates that a subset of the one or more symbols are downlink or flexible;
the UE is configured to monitor the dynamic WI in an SFI monitoring occasion for the one or more symbols, wherein at least one of the one or more symbols is a semi-static flexible symbol, and the UE does not detect the SH in the monitoring occasion;
the UE detects a DCI format indicating the UE to receive downlink signals on at least one of the one or more symbols; and
a dynamically scheduled PUSCH conflicts with a configured grant PUSCH.

10. The method of claim 9, wherein the processing time is determined based on a specific condition of listed conditions in claim 9, wherein the specific condition triggers the cancellation.

11. The method of claim 1, wherein the determining the processing time for the UE further comprises:
detecting a dynamic slot-format indicator (SFI) or a mis-detection of SFI indicating a request to cancel the uplink transmission; and
adopting the first processing time as the processing time for the UE before the cancellation of uplink transmission.

12. The method of claim 1, wherein the determining the processing time for the UE further comprises:
detecting a dynamic grant indicating a request to cancel the uplink transmission; and
adopting the second processing time as the processing time for the UE before the cancellation of uplink transmission.

13. The method of claim 3, wherein the computing the first processing time value based on the first number of symbols further comprises:
determining the first processing time value as:
a first equivalent time value corresponding to the number of symbols when a first symbol of the PUSCH only has demodulation reference signals (DMRS),
a second equivalent time value corresponding to the number of symbols plus one when the first symbol of the PUSCH contains both DMRS and data, or
a bandwidth part (BWP) switching time when an uplink grant indicates a BWP switch.

14. A user equipment (UE) configured with a first UE processing capability parameter and a second UE processing capability parameter on an uplink carrier of wireless communication, comprising:
a transceiver configured to:
transmit, to a base station (BS), an uplink transmission on one or more symbols according to radio resource control (RRC) configuration parameters received from the BS; and
a processor configured to:
determine that a cancellation of the uplink transmission on the one or more symbols to the BS is scheduled,
determine a processing time for the UE before the cancellation of uplink transmission to be a first processing time derived from the first UE processing capability parameter in response to a low priority grant indicating a request to cancel the uplink transmission or to be a second processing time derived from the second UE processing capability parameter in response to a high priority grant indicating the request to cancel the uplink transmission, wherein the first processing time is greater than the second processing time, and
cancel the uplink transmission to the BS when the determined processing time has lapsed.

15. The UE of claim 14, wherein the processor is further configured to determine the processing time for the UE by:
determining the first processing time by:
retrieving a first pre-stored preparation time in a format of a first number of symbols according to a subcarrier spacing parameter used in an orthogonal frequency division multiplexing (OFDM) scheme and the first UE processing capability parameter, and,
computing a first processing time value based on the first number of symbols; and determining the second processing time by:
retrieving a second pre-stored preparation time in a format of a second number of symbols according to the subcarrier spacing parameter used in the OFDM scheme and the second UE processing capability parameter, and,
computing a second processing time value based on the second number of symbols.

16. The UE of claim 15, wherein the processor is further configured to determine the processing time for the UE by:
adopting the first processing time as the processing time for the UE before the cancellation of uplink transmission.

17. The UE of claim 15, wherein the processor is further configured to determine the processing time for the UE by:
adopting the second processing time as the processing time for the UE before the cancellation of uplink transmission.

18. The UE of claim 14, wherein the processor is further configured to determine the processing time for the UE by:
determining that the uplink transmission between the UE and the BS is of a first type, and adopting the first processing time as the processing time for the UE based on the first type; or
determining that the uplink transmission between the UE and the BS is of a second type that is different from the first type, and adopting the second processing time as the processing time based on the second type.

19. The UE of claim 18, wherein the first type includes at least one of:
a physical uplink control channel (PUCCH) transmission,
a sounding reference signal (SRS) transmission, or
a physical random-access channel (PRACH) transmission.

20. The UE of claim 14, wherein the processor is further configured to determine the processing time for the UE by:

determining that the uplink transmission between the UE and the BS is a PUSCH with configured grant;

determining a priority level of the PUSCH with configured grant between the UE and the BS;

adopting the first processing time as the processing time for the UE before the cancellation of uplink transmission when the PUSCH is assigned a low priority level; and adopting the second processing time as the processing time for the UE before the cancellation of uplink transmission when the PUSCH is assigned a high priority level.

21. The UE of claim 14, wherein the cancellation of the uplink transmission on the one or more symbols is due to at least one of following conditions:

a dynamic slot-format indicator (SFI) indicates that a subset of the one or more symbols are downlink or flexible;

the UE is configured to monitor the dynamic SH in an SFI monitoring occasion for the one or more symbols, wherein at least one of the one or more symbols is a semi-static flexible symbol, and the UE does not detect the SFI in the monitoring occasion;

the UE detects a DCI format indicating the UE to downlink signals on at least one of the one or more symbols; and a dynamically scheduled PUSCH conflicts with a configured grant PUSCH, and wherein the processing time is determined based on a specific condition that triggers cancellation.

22. The UE of claim 21, wherein the processing time is determined based on a specific condition of listed conditions in claim 21, and wherein the specific condition triggers the cancellation.

23. The UE of claim 14, wherein the processor is further configured to determine the processing time for the UE by:

detecting a dynamic slot-format indicator (SF or a is-detection of SFI indicating a request to cancel the uplink transmission; and adopting the first processing time as the processing time for the UE before cancellation of uplink transmission.

24. The UE of claim 14, Therein the processor is further configured to determine the processing time for the UE by:

detecting a dynamic grant indicating a request to cancel uplink transmission; and adopting the second processing time as the processing time for the UE before cancellation of uplink-transmission.

25. The LIE of claim 15, wherein the processor is further configured to compute the first processing time value based on the first number of symbols by:

determining the first processing time value as:

a first equivalent time value corresponding to the number of symbols when a first symbol of the PUSCH only has demodulation reference signals (DMRS), a second equivalent time value corresponding to the number of symbols plus uric when the first symbol of the PUSCH contains both DMRS and data, or a bandwidth part (MVP) switching time when an uplink grant indicates a MVP switch.

26. A processor-readable non-transitory storage medium storing processor-executable instructions for a user equipment (UE) of wireless communication, the instructions executable by a processor to perform operations comprising:

transmitting, from the UE configured with a first UE processing capability parameter and a second UE processing capability parameter on an uplink carrier, to a base station (BS), an uplink transmission on one or more symbols according to radio resource control (RRC) configuration parameters received from the BS;

determining, by the UE, that a cancellation of the uplink transmission on the one or more symbols to the BS is scheduled;

determining, by the UE, a processing time for the UE before the cancellation of uplink transmission to be a first processing time derived from the first UE processing capability parameter in response to a low priority grant indicating a request to cancel the uplink transmission or to be a second processing time derived from the second UE processing capability parameter in response to a high priority grant indicating the request to cancel the uplink transmission, wherein the first processing time is greater than the second processing time; and cancelling, by the UE, the uplink transmission to the BS when the determined processing time has lapsed.

* * * * *